(12) United States Patent
Itskovich et al.

(10) Patent No.: US 7,385,401 B2
(45) Date of Patent: Jun. 10, 2008

(54) HIGH RESOLUTION RESISTIVITY EARTH IMAGER

(75) Inventors: Gregory B. Itskovich, Houston, TX (US); Alexandre N. Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 192 days.

(21) Appl. No.: 11/177,183

(22) Filed: Jul. 8, 2005

(65) Prior Publication Data

US 2007/0007967 A1    Jan. 11, 2007

(51) Int. Cl.
*G01V 3/00* (2006.01)
*G01V 3/02* (2006.01)

(52) U.S. Cl. ........................ 324/357; 324/347
(58) Field of Classification Search ................. 324/354, 324/357, 366, 367, 374
See application file for complete search history.

(56) References Cited

U.S. PATENT DOCUMENTS

| | | | | |
|---|---|---|---|---|
| 2,838,730 A * | 6/1958 | Lebourg | | 324/324 |
| 2,930,969 A | 3/1960 | Shannon | | 324/10 |
| 3,365,658 A | 1/1968 | Birdwell | | 324/10 |
| 4,122,387 A | 10/1978 | Ajam et al. | | 324/10 |
| 4,468,623 A | 8/1984 | Gianzero et al. | | 324/367 |
| 4,692,908 A * | 9/1987 | Ekstrom et al. | | 367/27 |
| 5,502,686 A | 3/1996 | Dory et al. | | 367/34 |
| 5,677,631 A | 10/1997 | Reittinger et al. | | 324/324 |
| 5,737,277 A | 4/1998 | Priest | | 367/27 |
| 6,560,889 B1 | 5/2003 | Lechen | | 33/544.3 |
| 6,600,321 B2 | 7/2003 | Evans | | 324/369 |
| 6,714,013 B2 | 3/2004 | Misic | | 324/318 |
| 6,919,724 B2 * | 7/2005 | Cheung et al. | | 324/366 |
| 7,073,609 B2 * | 7/2006 | Tabanou et al. | | 175/50 |
| 2003/0164706 A1 | 9/2003 | Iwanicki et al. | | 324/375 |
| 2004/0051531 A1 | 3/2004 | Chemali et al. | | 324/367 |
| 2005/0134280 A1 | 6/2005 | Bittar et al. | | 324/367 |
| 2005/0179437 A1* | 8/2005 | Hayman et al. | | 324/347 |
| 2006/0293857 A1* | 12/2006 | Moos et al. | | 702/12 |

FOREIGN PATENT DOCUMENTS

CA          685727          5/1960

* cited by examiner

*Primary Examiner*—Reena Aurora
*Assistant Examiner*—Kenneth J Whittington
(74) *Attorney, Agent, or Firm*—Madan, Mossman & Sriram, P.C.

(57) ABSTRACT

Measurements made by a resistivity imaging tool in a borehole having non-conductive mud in a conductive earth formation are corrected using the tool standoff. The correction involves removing a calibration signal determined in a medium of high conductivity from the measured impedance. The magnitude and/or the real part of the impedance may be used.

22 Claims, 8 Drawing Sheets

HIGH RESOLUTION RESISTIVITY EARTH IMAGER

BACKGROUND OF THE INVENTION

1. Field of the Invention

This invention generally relates to exploration for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies. U.S. Pat. No. 6,714,014 to Evans et al, having the same assignee as the present invention and the contents of which are incorporated herein by reference, teaches the use of capacitive coupling with both oil-based mud and water-based mud.

The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents. Another drawback is that in formations with low resistivity (such as the Gulf of Mexico), the measured signal is dominated by the effects of the internal impedance of the measurement system and the effects of the borehole fluid. It would be desirable to have an apparatus and method of determination of formation resistivity that is relatively insensitive to borehole rugosity and can be used with either water based or with oil-based muds. The present invention satisfies this need.

SUMMARY OF THE INVENTION

One embodiment of the invention is an apparatus for sensing a resistivity parameter of an earth formation penetrated by a borehole. The apparatus includes at least one measure electrode connected to a source of electrical current. The at least one measure electrode conveys a measure current into the formation. The apparatus also includes a device which measures a standoff between the at least one measure electrode and a wall of the borehole. A processor estimates the resistivity parameter based at least in part on an impedance determined from the measure current and/or the potential of the electrode, and the standoff. The at least one measure electrode may include a plurality of measure electrodes on a pad extendable from a body of a logging tool conveyed in the borehole. There may be additional pads having additional measure electrodes. The borehole may have a substantially nonconducting fluid therein. The electrical current may have a frequency between 100 kHz and 50 MHz. The standoff may be measured by an acoustic caliper or a mechanical caliper. A resistivity image of the borehole wall may be determined. The processor may estimate the resistivity parameter by subtracting from the magnitude or the real part of the measured impedance a calibration factor determined from a look-up table. The look up table may be based on a standoff, a fluid resistivity and/or an impedance measured in a highly conductive formation.

Another embodiment of the invention is a method of estimating a resistivity parameter of an earth formation penetrated by a borehole. The method includes conveying a measure current into the formation using at least one measure electrode. A standoff between the at least one measure electrode and a wall of the borehole is measured. An impedance is determined from the measure current and/or the potential of the electrode. The resistivity parameter is obtained from the determined impedance and the standoff. The at least one measure electrode and a plurality of additional measure electrodes may be positioned on a pad extendable from a body of a logging tool conveyed in the borehole. An additional pad having a plurality of measure electrodes may be used. The borehole may have a substantially nonconducting fluid therein. The electrical current may have a frequency between 100 kHz and 50 MHz. The resistivity parameter may be determined by subtracting from the magnitude of the measured impedance or the real part of the measured impedance a value from a lookup table. The lookup table may include an offset, a mud resistivity, and an impedance measured in a highly conductive formation. The method may further involve measuring the resistivity of the fluid in the borehole.

Another embodiment of the invention is a computer readable medium for use with an apparatus which senses a resistivity parameter of an earth formation penetrated by a borehole. The apparatus includes at least one measure electrode connected to a source of electrical current and conveying a measure current into the formation, and a device which measures a standoff between the at least one measure electrode and a wall of the borehole. The medium includes instructions which enable a processor to estimate the resistivity parameter based on a determined impedance and the standoff. The computer readable medium may be a ROM, an EPROM, an EAROM, a Flash Memory, and/or an Optical Disk

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
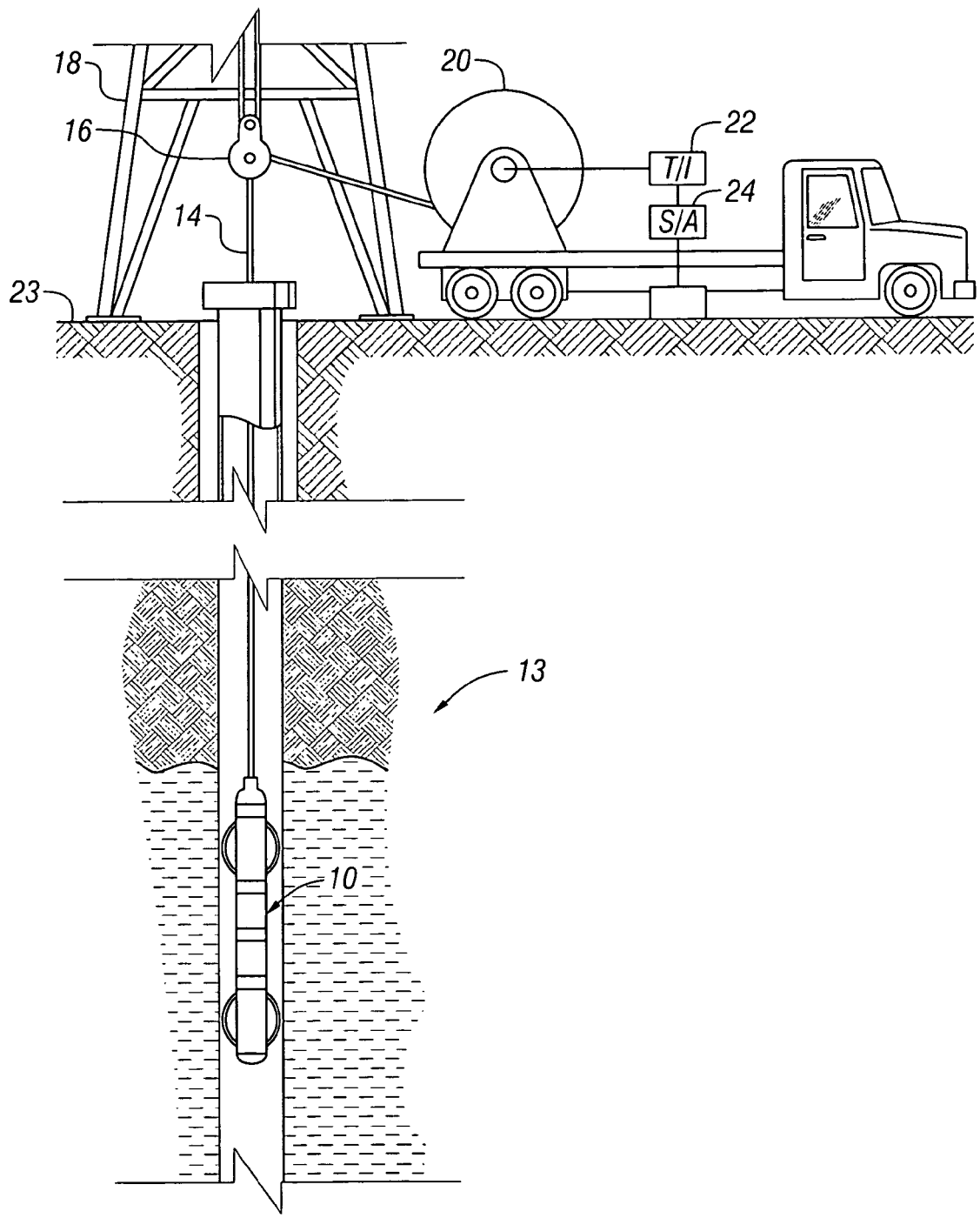
FIG. 1 (prior art) shows an exemplary logging tool suspended in a borehole.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figures 2A, 2B:
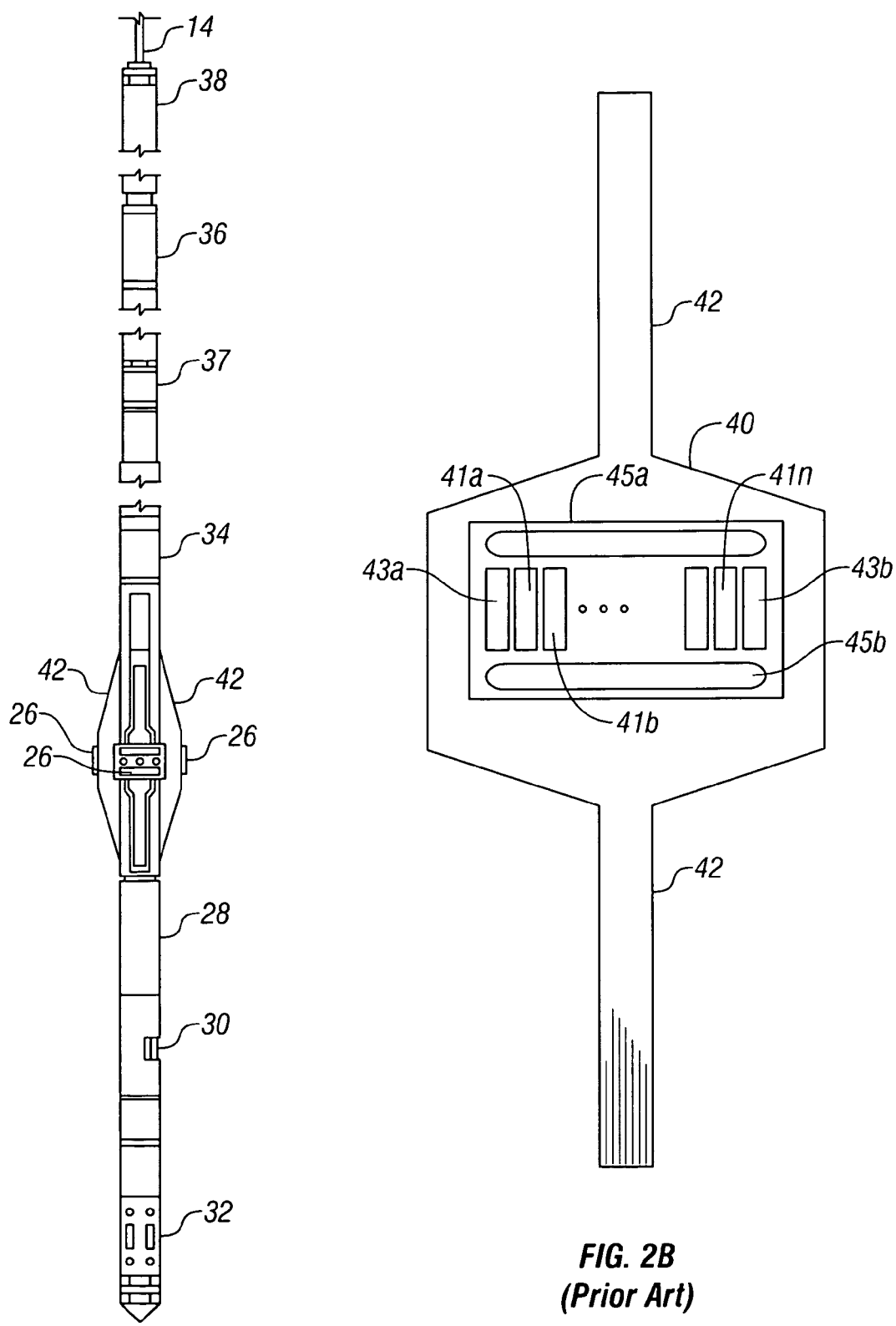
FIG. 2A (prior art) is a mechanical schematic view of an exemplary imaging tool.
FIG. 2B (prior art) is a detail view of an electrode pad of an exemplary logging tool.

FIG. 2a is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2A are three resistivity arrays 26 (a fourth array is hidden in this view. Referring to FIGS. 2A and 2B, each array includes measure electrodes 41a, 41b . . . 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

Figure 3:
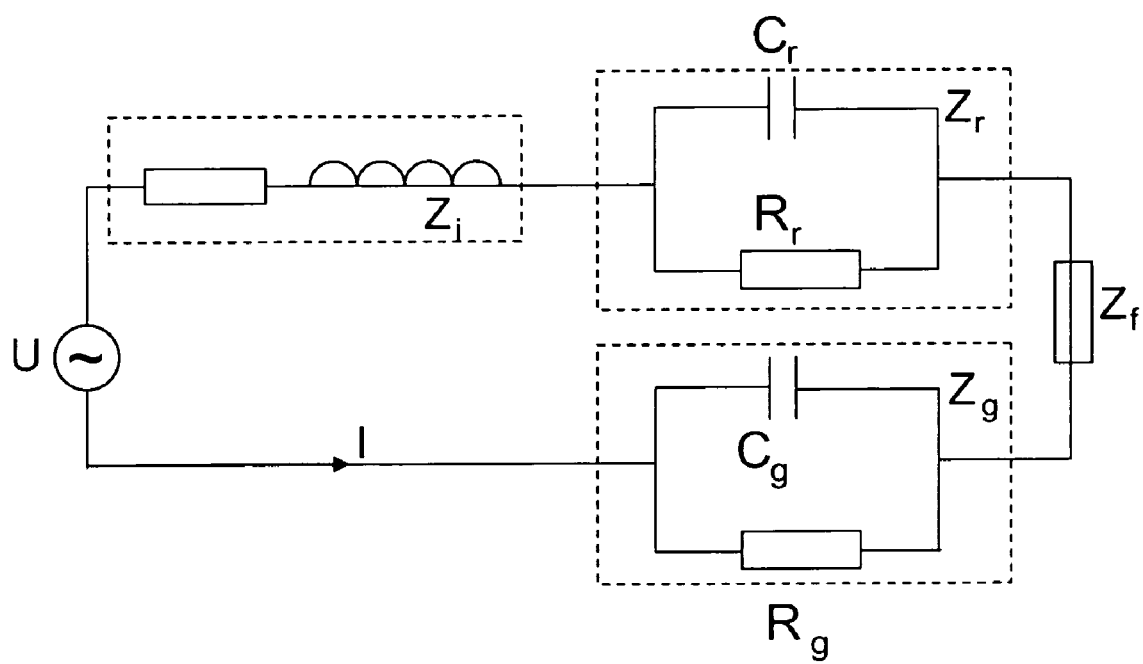
FIG. 3 is an equivalent circuit representation of a resistivity tool in a borehole.

The approximate schematic circuit diagram is presented in FIG. 3. It shows that the current in the circuit depends on the internal impedance of the tool $Z_i$, the impedance due to the standoff between return electrode and formation $Z_R$, the impedance due to the gap between receiver and formation $Z_g$ and the formation impedance $Z_f$. If U is the applied voltage then the current in the circuitry is $$I = \frac{U}{Z_i + Z_r + Z_g + Z_f}. \quad (1)$$

Figure 4A:
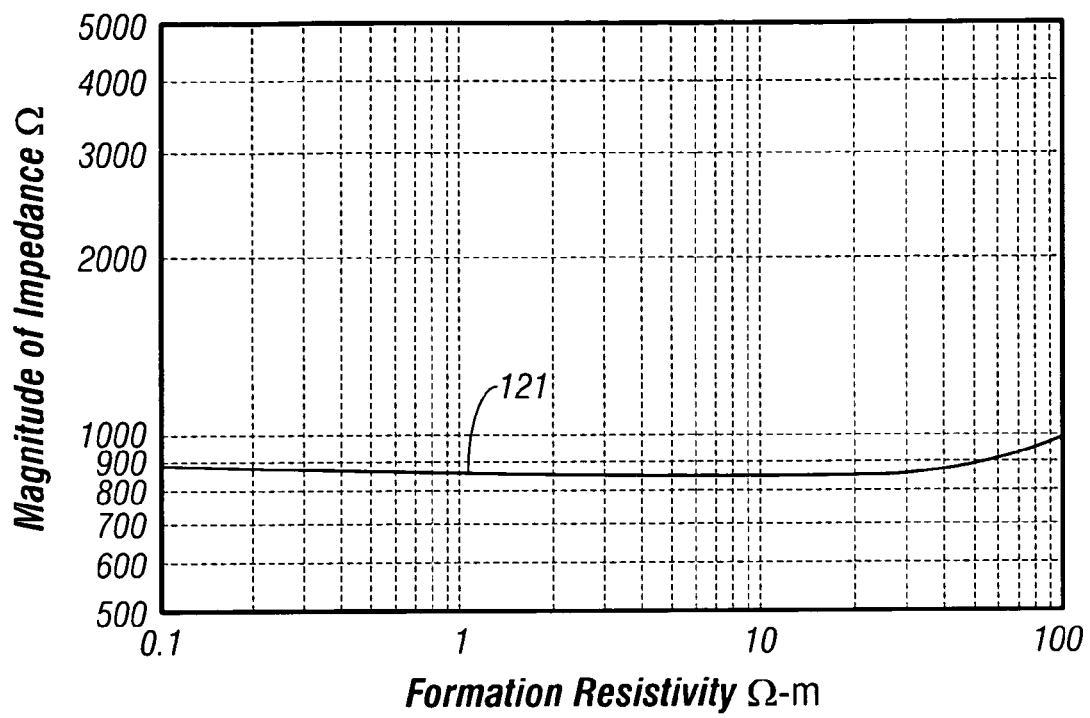
FIGS. 4a and 4b show plots of the magnitude of the measured impedance as a function of formation resistivity before and after calibration for a homogenous formation.
Figure 4B:
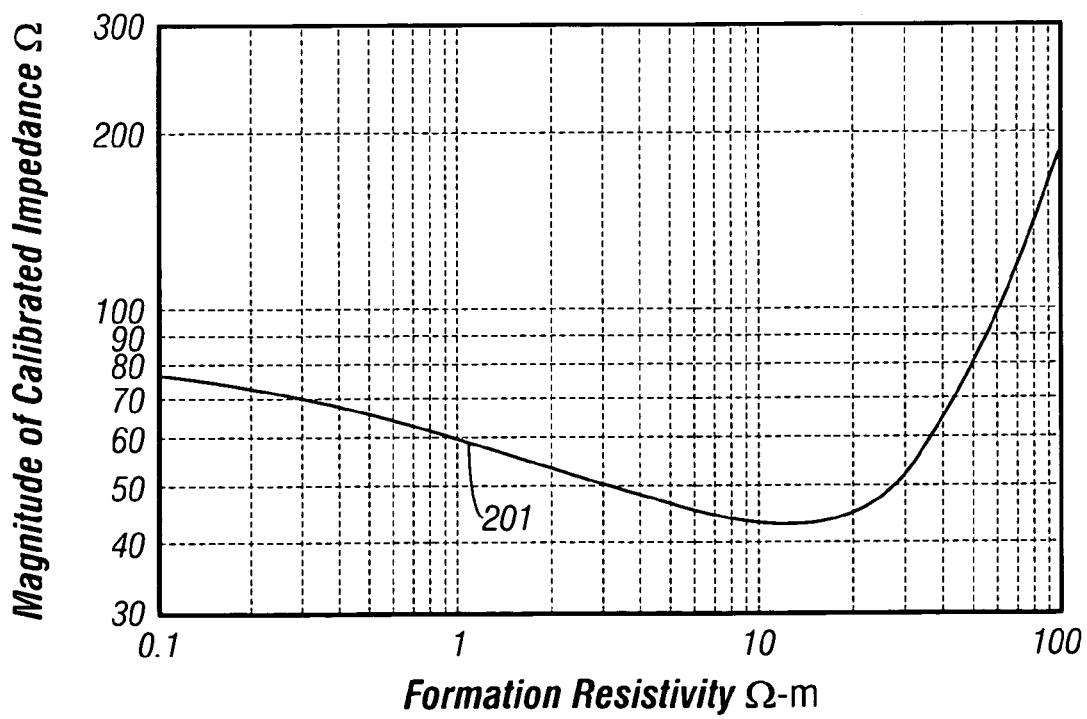

When an oil-based mud is used in a conductive formation ($\rho$<10 $\Omega$-m) the contribution of the formation into the effective impedance is small:

$$Z_f << Z_i + Z_r + Z_g \quad (2).$$

and we can expect a reduction of the sensitivity to the resistivity of formation. Mathematical modeling confirms these expectations. FIG. 4 shows mathematical modeling results in an exemplary case when tool is placed in a borehole of diameter 8.5 inch (21.59 cm) filled with mud having a resistivity of 10E+5 $\Omega$-m. The formation is modeled by a cylindrical layer with resistivity varying from 0.1 $\Omega$-m to 10 $\Omega$-m. The return of the tool represents a conductive cylinder with 0.0508 m radius and 10 m in length. Current is injected into the formation through 1.6 cm cylindrical electrode that has 1 mm standoff with respect to formation. The transmitter provides an output voltage of 1V at frequency of 1 MHz. FIG. 4a shows that the magnitude of the impedance 121 has a small dynamic range between 880 and 1000 $\Omega$ while resistivity of formation (the abscissa) varies over 2 orders of magnitude from 0.1 to 10 $\Omega$-m.

Figure 5:
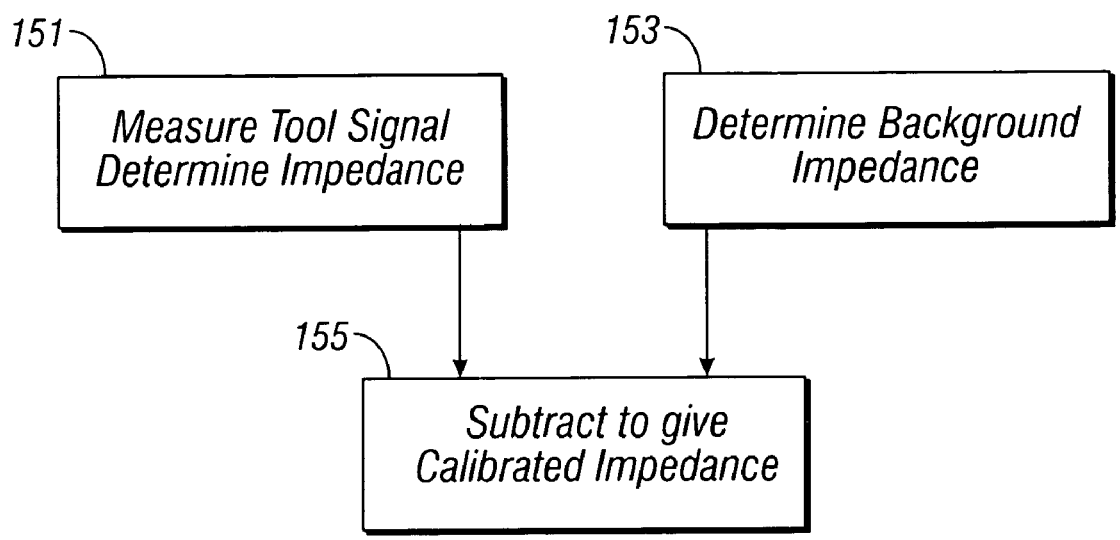
FIG. 5 is a flow chart illustrating the method of the present invention.

The method of the present invention is illustrated in FIG. 5. From the measured apparent tool signal, an apparent impedance is determined 151. This may be done using the current in the measure electrode, the potential of the measure electrode to a remote reference, or a combination thereof. The background impedance 153 is subtracted 155 to give a calibrated impedance. The background impedance is related to the quantity $Z_{back} = Z_i + Z_r + Z_g$. In one embodiment of the invention, the apparent impedance is the magnitude of the circuit impedance given by the denominator of eqn. (1) and the background impedance is the magnitude of $Z_{back}$. The background impedance is tool specific and is obtained either by actual physical measurement with the tool suspended in a calibration tank. Alternatively, the background impedance is determined by numerical simulation. The various factors that affect the background impedance are discussed next.

One component of $Z_{back}$ is the internal tool impedance $Z_i$. This can be measured in the laboratory and adjusted, if necessary, for temperature changes downhole using known temperature drift corrections. The second component is $Z_r$ that is due to the gap between the return electrode and the formation. As can be seen in FIG. 3, this has a resistive component $R_r$ in parallel with a capacitive component $C_r$. $Z_r$ is given by $$Z_r = \frac{R_r\left(\frac{1}{j\omega C_r}\right)}{R_r + \left(\frac{1}{j\omega C_r}\right)} = \frac{R_r}{1 + j\omega C_r R_r}. \quad (3)$$

When nonconductive (oil based) mud is used, at the frequencies of operation (typically 100 kHz-10 MHz), the $Z_r$ is small due to the large area of the equivalent capacitor. Consequently, the effect of $Z_r$ can usually be ignored. Similarly, $$Z_g = \frac{R_g}{1 + j\omega C_g R_g} = \frac{R_g}{(1 + \omega^2 C_g^2 R_g^2)^{1/2}}(1 - j\omega C_g R_g) \quad (4)$$

The largest component of the background impedance is $Z_g$. $R_g$ increases linearly with the gap between the measure electrode and the borehole wall while $C_g$ varies inversely with the gap length, so that the product $C_g R_g$ is approximately constant. So qualitatively, the main effect is due to the linear increase in $R_g$ with gap length in eqn. (4). If the mud resistivity and dielectric constant are known, then the background impedance can be determined from a measurement of the gap between the measure electrode and the formation. Such a measurement is readily made using a mechanical caliper or an acoustic caliper. If we perform a calibration by subtracting from the curve in FIG. 4a the impedance corresponding to the ideally conductive formation we obtain a curve (FIG. 4b) that has much better dynamic range (40-200 $\Omega$-m). In the other words curve 201 in FIG. 4b reflects better sensitivity of the impedance to the formation resistivity.

Figure 6A:
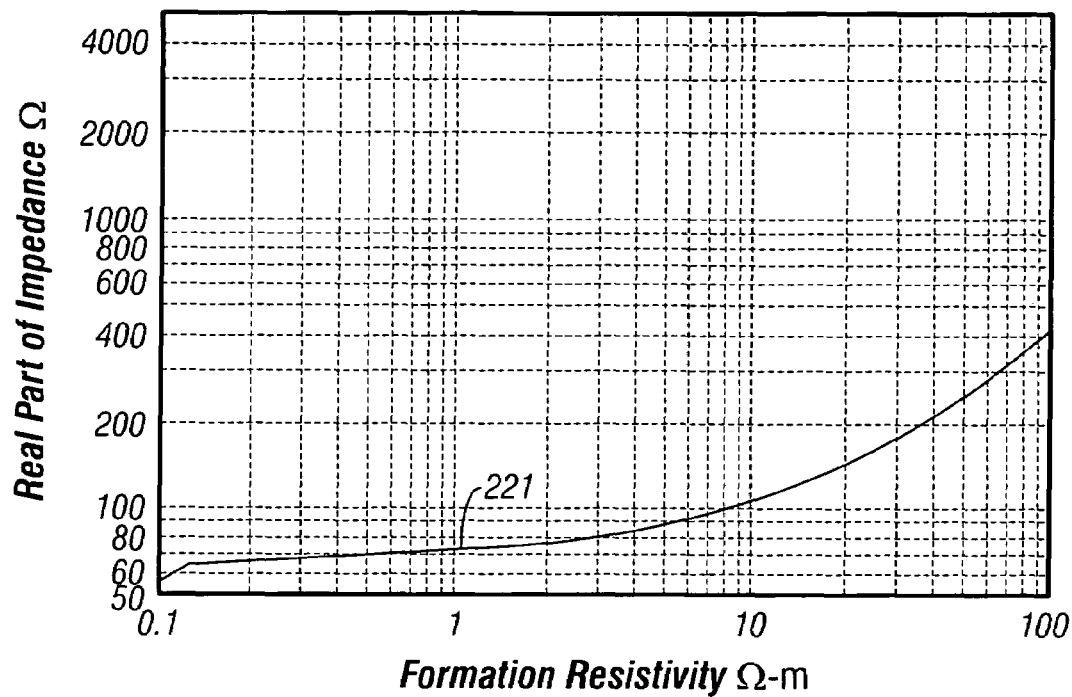
FIGS. 6a and 6b show plots of the real component of the measured impedance as a function of formation resistivity before and after calibration for a homogenous formation.
Figure 6B:
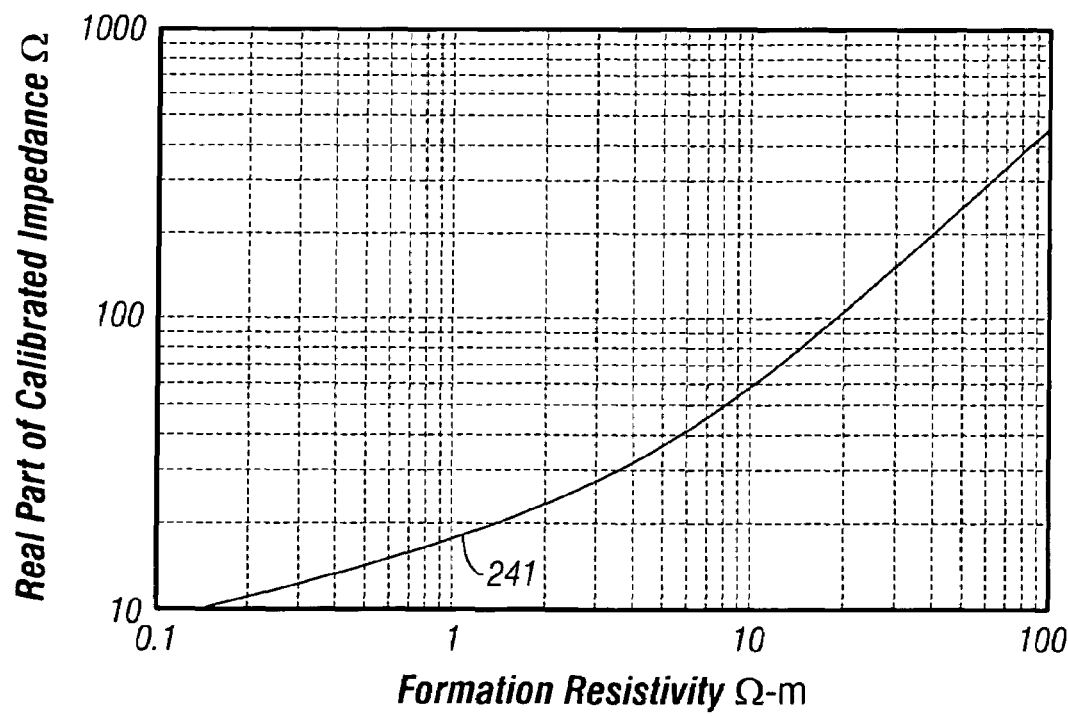

In another embodiment of the invention, instead of using the magnitude of the impedance, the real part of the resistivity is used. FIG. 6a shows the real part of the impedance 221 as a function of the formation resistivity and shows a larger dynamic range (and hence resolution) compared to the magnitude of the impedance. By applying calibration to the real part of the impedance we further improve sensitivity of the real part impedance to the formation resistivity. See 241 in FIG. 6b.

Figure 7A:
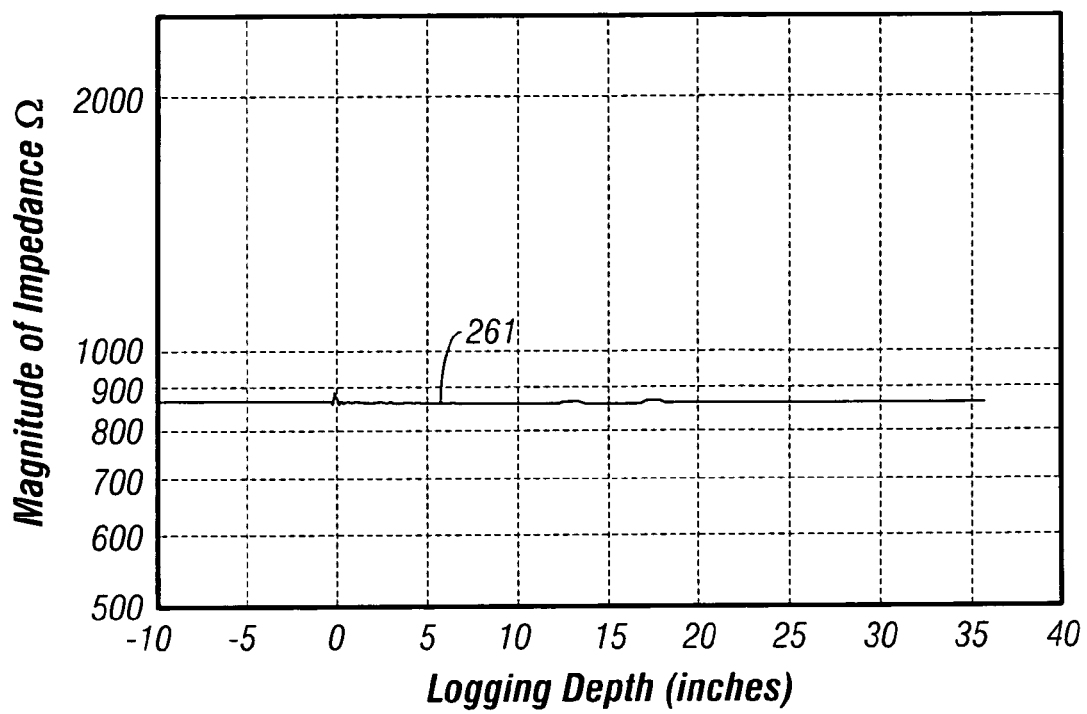
FIGS. 7a and 7b show plots of the magnitude of the measured impedance as a function of formation resistivity before and after calibration for a layered earth model.
Figure 7B:
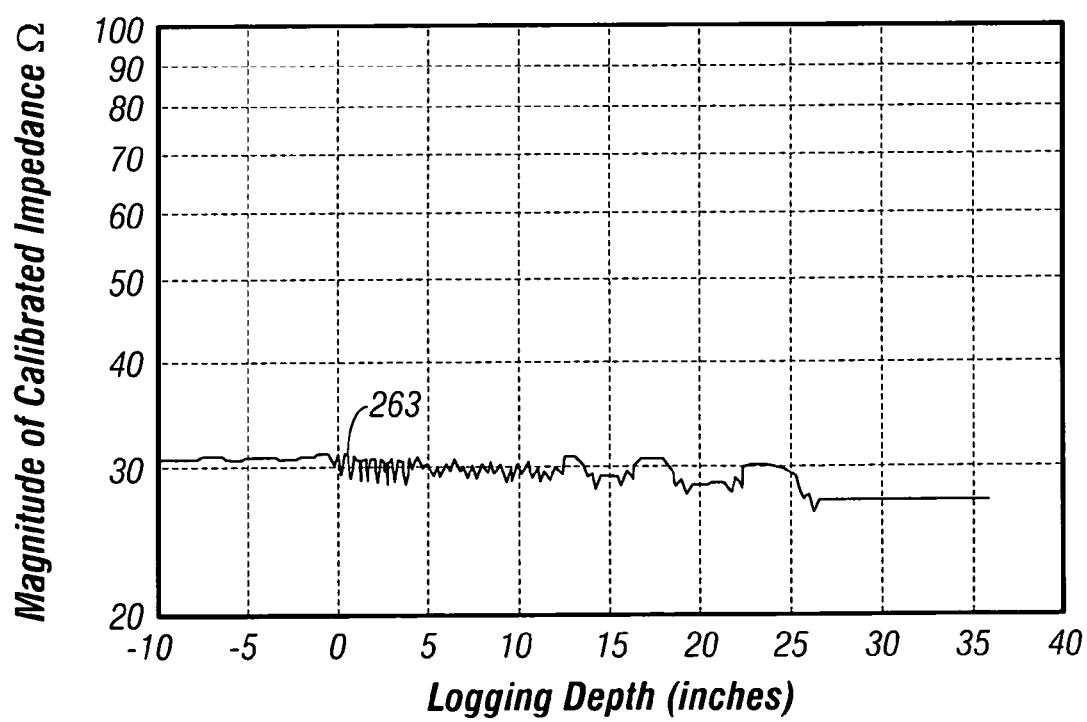
Figure 8A:
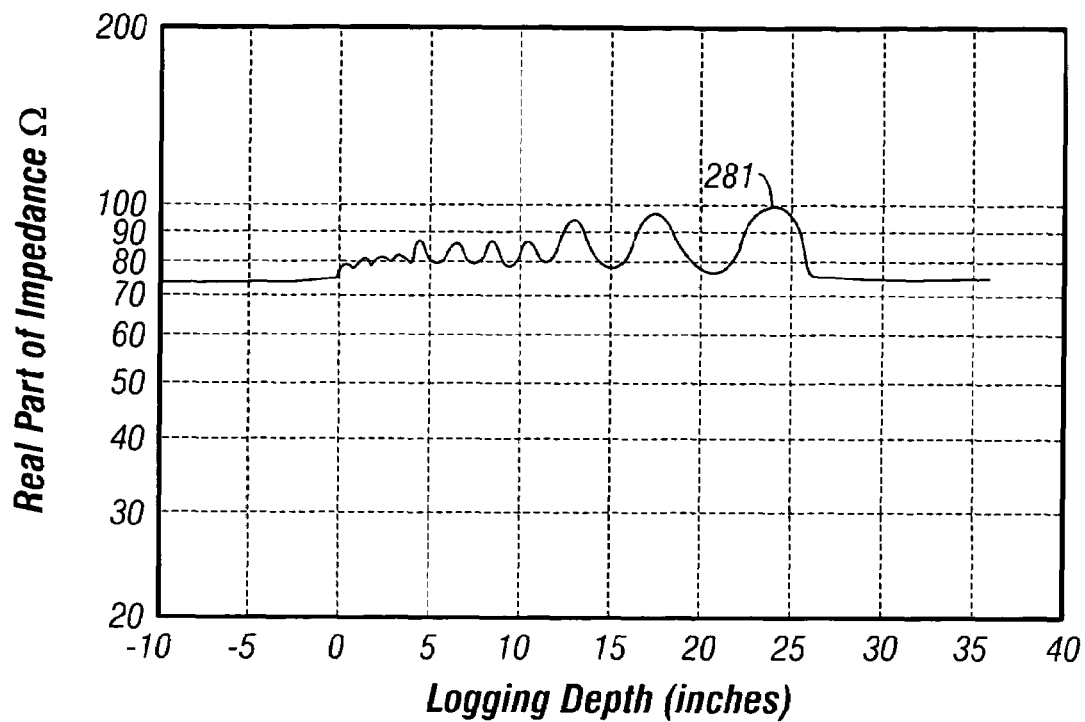
FIGS. 8a and 8b show plots of the real component of the measured impedance as a function of formation resistivity before and after calibration for a layered earth model.

The advantage of the calibrated measurements and the real part impedance measurements can be illustrated further for the case of the layered formation. In FIGS. 7a-8b we present mathematical modeling results for a stratified formation that includes a sequence of resistive (10 $\Omega$-m) and conductive (1 $\Omega$-m) layers. The thickness of the layers varies from the left to the right between 0.5-4 in (1.27-10.16 cm). In FIG. 7a, it is seen that the magnitude of the impedance 261 is almost completely unable to resolve the individual layers. In FIG. 7b, it is seen that the calibrated magnitude of the impedance 263 is able to resolve the thicker layers. For the same model, FIG. 8a shows that the real part of the impedance 281 is able to resolve all but the thinnest layers.

Figure 8B:
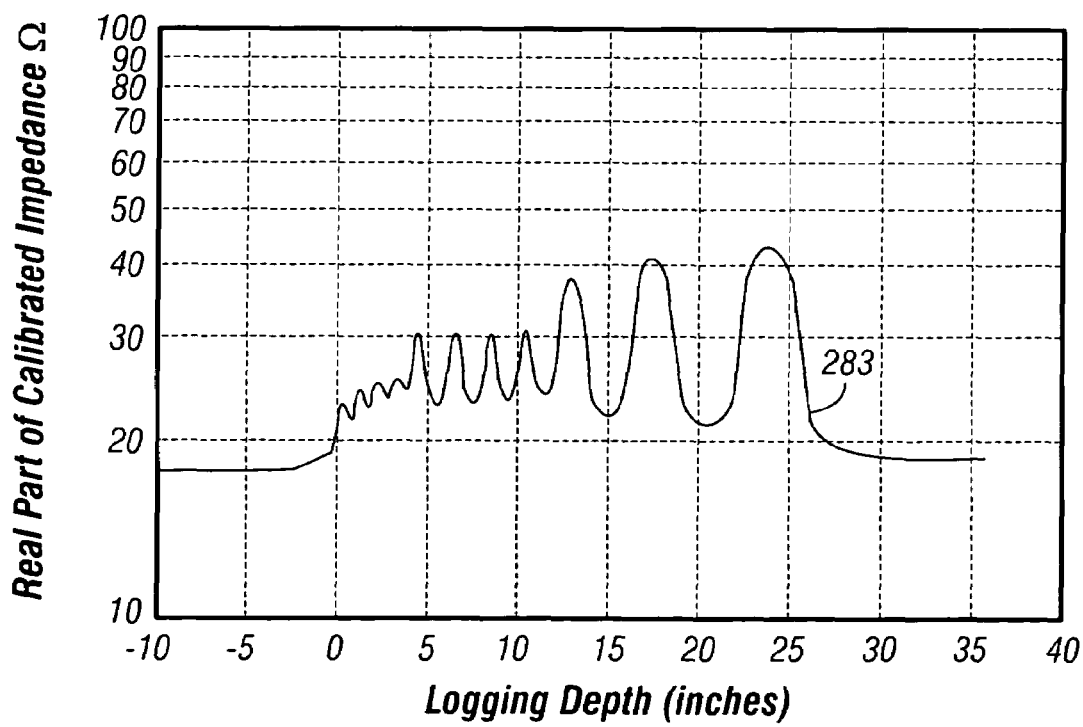

Finally, the calibrated real part of the impedance 283 in FIG. 8*b* is able to resolve all of the layers.

Mechanical calipers and acoustic calipers suitable for determining the standoff are well known in the art. See, for example, U.S. Pat. No. 6,560,889 to Lechen and U.S. Pat. No. 5,737,277 to Priest having the same assignee as the present invention and the contents of which are incorporated herein by reference. Determination of mud resistivity may be made downhole using the method and apparatus described in U.S. Pat. No. 6,803,039 to Fabris et al., having the same assignee as the present invention and the contents of which are incorporated herein by reference. The dielectric constant may be determined using the method and apparatus described in U.S. Pat. No. 5,677,631 to Reittinger et al., having the same assignee as the present invention and the contents of which are incorporated herein by reference. Precomputed tables may be stored in the memory of the surface processor or a downhole processor and a table look up performed using the measured standoff. This may be done separately for each of the imaging pads of the imaging tool. In one embodiment of the invention, the mud resistivity is assumed to be known: this simplifies the look up table. In another embodiment of the invention, the mud resistivity is measured downhole. The method then requires that the lookup table include the standoff and mud resistivity as parameters. The term "processor" as used in this document is intended to include devices such as field programmable gate arrays (FPGAs).

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drill string or on coiled tubing. An example of a resistivity imaging tool for MWD use is discloses in U.S. Pat. No. 6,600,321 to Evans, having the same assignee as the present invention and the contents of which are incorporated herein by reference.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for sensing a resistivity parameter of an earth formation penetrated by a borehole, the apparatus comprising:
    (a) at least one measure electrode configured to convey a measure current through the formation, the at least one measure electrode having a potential;
    (b) a device configured to determine a standoff between the at least one measure electrode and a wall of the borehole;
    (c) a processor configured to estimate the resistivity parameter using:
        (A) the standoff,
        (B) an impedance parameter determined from at least one of :(I) the measure current, and (II) the potential; and
        (C) a background impedance obtained by at least one of: (I) numerical simulation, (II) a measurement in a test tank, and (III) a measurement made in a highly conductive formation.

2. The apparatus of claim 1 wherein the at least one measure electrode comprises a plurality of measure electrodes on a pad extendable from a body of the logging tool conveyed in the borehole.

3. The apparatus of claim 2 further comprising an additional pad having a plurality of measure electrodes, the additional pad extendable from the body of the logging tool.

4. The apparatus of claim 1 wherein the borehole contains a substantially non-conducting fluid therein.

5. The apparatus of claim 4 wherein the electrical current has a frequency between 100 kHz and 50 MHz.

6. The apparatus of claim 1 wherein the device which measures the standoff is selected from the group consisting of (I) an acoustic caliper, and (II) a mechanical caliper.

7. The apparatus of claim 1 wherein the resistivity parameter comprises a resistivity image of the wall of the borehole.

8. The apparatus of claim 1 wherein the processor is configured to determine the resistivity parameter by further subtracting the background impedance from a look-up table from at least one of (i) a magnitude of the determined impedance, and (ii) a real component of the determined impedance.

9. The apparatus of claim 8 wherein the look-up table comprises at least one of (i) a standoff, (ii) a fluid resistivity, and (iii) a fluid dielectric constant.

10. The apparatus of claim 1 further comprising a device configured to measure a resistivity of a fluid in a borehole.

11. A method of estimating a resistivity parameter of an earth formation penetrated by a borehole, the method comprising:
    (a) conveying a measure current through the formation using at least one measure electrode having a potential;
    (b) estimating a standoff between the at least one measure electrode and a wall of the borehole;
    (c) determining an impedance parameter from at least one of (I) the measure current, and (II) the potential;
    (d) estimating the resistivity parameter from the determined impedance, the estimated standoff and a background impedance obtained by at least one of: (I) numerical simulation, (II) a measurement in a test tank, and (III) a measurement made in a highly conductive formation; and
    (e) recording the estimated resistivity parameter on a suitable medium.

12. The method of claim 11 further comprising measuring a resistivity of a fluid in the borehole.

13. The method of claim 11 further comprising positioning the at least one measure electrode and a plurality of additional measure electrodes on a pad extendable from a body of the logging tool conveyed in the borehole.

14. The method of claim 13 further comprising using an additional pad having a plurality of measure electrodes, the additional pad extendable from the body of the logging tool.

15. The method of claim 11 further comprising using a substantially non-conductive fluid in the borehole.

16. The method of claim 15 wherein the electrical current has a frequency between 100 kHz and 50 MHz.

17. The method of claim 11 further comprising measuring the offset using a device selected from the group consisting of (i) an acoustic caliper, and (ii) a mechanical caliper.

18. The method of claim 11 wherein the resistivity parameter comprises a resistivity image of the wall of the borehole.

19. The method of claim 11 wherein determining the resistivity parameter further comprises subtracting the background impedance from a look-up table from at least one of (i) a magnitude of the determined impedance, and (ii) a real component of the determined impedance.

20. The method of claim 19 further comprising using at least one of (i) an offset, (ii) a fluid resistivity, and (iii) a fluid dielectric constant in the look-up table.

21. A computer readable medium for use with an apparatus which senses a resistivity parameter of an earth formation penetrated by a borehole, the apparatus comprising:

(a) at least one measure electrode configured to convey a measure current through the formation, the at least one measure electrode having a potential; and (b) a device configured to measure a standoff between the at least one measure electrode and a wall of the borehole;

the medium comprising instructions which enable a processor to:

(c) estimate the resistivity parameter using the standoff, an impedance parameter determined from the current and the voltage and a background impedance obtained by at least one of: (I) numerical simulation, (II) a measurement in a test tank, and (III) a measurement made in a highly conductive formation, and (d) record the estimated resistivity parameter on a suitable medium.

22. The computer readable medium of claim 12 further comprising at least one of (i) a ROM, (ii) an EPROM, (iii) an EAROM, (iv) a Flash Memory, and (v) an Optical disk.

* * * * *